(12) United States Patent
Hale et al.

(10) Patent No.: US 8,362,883 B2
(45) Date of Patent: Jan. 29, 2013

(54) METHOD AND SYSTEM FOR THE PRESENTATION OF INFORMATION VIA THE TACTILE SENSE

(75) Inventors: Kelly S. Hale, Oviedo, FL (US); Sven Fuchs, Westerrönfeld (DE); Matthew Johnston, Gainesville, FL (US)

(73) Assignee: Design Interactive, Inc., Oviedo, FL (US)

( * ) Notice: Subject to any disclaimer, the term of this patent is extended or adjusted under 35 U.S.C. 154(b) by 668 days.

(21) Appl. No.: 12/482,073

(22) Filed: Jun. 10, 2009

(65) Prior Publication Data

US 2010/0328051 A1 Dec. 30, 2010

Related U.S. Application Data

(60) Provisional application No. 61/060,267, filed on Jun. 10, 2008.

(51) Int. Cl.
*H04B 3/36* (2006.01)
*G08B 23/00* (2006.01)
*G08G 1/123* (2006.01)
*A63F 9/24* (2006.01)

(52) U.S. Cl. .......... 340/407.1; 340/988; 340/573.1; 340/573.4; 463/30

(58) Field of Classification Search .............. None
See application file for complete search history.

(56) References Cited

U.S. PATENT DOCUMENTS

| | | | | |
|---|---|---|---|---|
| 5,803,740 A | * | 9/1998 | Gesink et al. | 434/112 |
| 5,807,111 A | * | 9/1998 | Schrader | 434/112 |
| 7,467,746 B2 | * | 12/2008 | Olmos et al. | 235/449 |
| 7,675,411 B1 | * | 3/2010 | Michaelis et al. | 340/539.12 |
| 7,696,860 B2 | * | 4/2010 | Gilson et al. | 340/407.1 |
| 2007/0139167 A1 | * | 6/2007 | Gilson et al. | 340/407.1 |
| 2008/0095576 A1 | * | 4/2008 | Donald et al. | 404/34 |
| 2008/0107481 A1 | * | 5/2008 | Donald et al. | 404/9 |
| 2008/0120029 A1 | * | 5/2008 | Zelek et al. | 701/213 |
| 2009/0032590 A1 | * | 2/2009 | Hopkins | 235/385 |
| 2009/0220923 A1 | * | 9/2009 | Smith et al. | 434/113 |
| 2009/0283026 A1 | * | 11/2009 | Cook et al. | 116/205 |

OTHER PUBLICATIONS

Hong Z.Tan, Robert Gray,J.Jay Young, Ryan Traylor, A Haptic Back Display for Attentional and Directional Cueing,Haptics-e,vol. 3 No. 1, http://www.haptics-e.org, (Nov. 13, 2003).

Jan B.F. Van Erp & Hendrick A.H.C. Van Veen, Vibro-Tactile Information Presentation in Automobiles, Eurohaptics 2001 Conference, University of Birmingham, Birmingham, AL.

Frank A. Geldard; Some Neglected Possibilities of Communication;Science, New Series, vol. 131, No. 3413, May 27, 1960, pp. 1583-1588.

Richard D. Gilson, Elizabeth S. Redden, and Linda R. Elliott; Remote Tactile Displays for Future Soldiers;U.S. Army Research Laboratory; ARL-SR-0152, May 2007; pp. ii-73.

(Continued)

*Primary Examiner* — Julie Lieu
(74) *Attorney, Agent, or Firm* — Terry M. Sanks; Beusse Wolter Sanks Mora & Maire, P.A.

(57) ABSTRACT

Methods are provided for communicating information via a tactile sense is provided. In one embodiment, the method comprises receiving input information at a controller comprising a processor. In addition, the method comprises generating a tactile sequence from the input information according to a predetermined communication structure via the controller and transmitting the tactile sequence to a display comprising a plurality of activators. Thereafter, the method comprises outputting the tactile sequence on the display. Systems are also provided for carrying out the described methods.

18 Claims, 5 Drawing Sheets

OTHER PUBLICATIONS

Jan B.F. Van Erp, Presenting directions with a vibrotactile torso display, Ergonomics, vol. 48, No. 3, Feb. 22, 3005, pp. 302-313.
Office of Naval Research, Contract No. N00014-07-M-0005, May 15, 2007, 25 pages.
Communication; Office of Naval Research, Contract No. N00014-07-M-0005; Oct. 31, 2007, 16 pages.
Laboratory Report No. 2004-10, Mar. 2004, pp. 1-43.
Proc. of ACM CHI 2005, Apr. 2-7, 2005, Portland, Oregon, 10 pages.

* cited by examiner

FIG. 11

| Location | | Commands | Core Content | | | Qualifier | |
|---|---|---|---|---|---|---|---|
| Direction | Distance | | Objects | Status | Responses | Direction | Numeric |
| Move Ahead | 1(Digit) | Ammo Request | Casualty | At checkpoint | I don't understand | Move Ahead | 1(Digit) |
| Move Ahead-Left | 2(Digit) | Check ammo | Door | Can't make objective | I understand/ Do you understand? | Move Ahead-Left | 2(Digit) |
| Move Ahead-Right | 3(Digit) | Corpman up | Enemy | Contact point | | Move Ahead-Right | 3(Digit) |
| Move Behind | 4(Digit) | (Team Member Down) | IED | Rally point | No | Move Behind | 4(Digit) |
| Move Behind-Left | 5(Digit) | Disperse | Hostage | Reloading | OK/Yes/Will do | Move Behind-Left | 5(Digit) |
| Move Behind-Right | 6(Digit) | Follow | Non-Combatant | SAW jammed | | Move Behind-Right | 6(Digit) |
| Move Left | 7(Digit) | Flank left | Sniper | Weapon failure/down | | Move Left | 7(Digit) |
| Move Right | 8(Digit) | Flank right | Danger Area | Weapon jammed | | Move Right | 8(Digit) |
| | 9(Digit) | Freeze | Vehicle | All across | | | 9(Digit) |
| Look Ahead | 0(Digit) | Halt | Armor | Shoot/Splash over | | Look Ahead | 0(Digit) |
| Look Ahead-Left | | Leaders up | Commander | | | Look Ahead-Left | |
| Look Ahead-Right | | Move Out/Go/Take objective | Infantry | | | Look Ahead-Right | |
| Look Behind | | Rally on me | | | | Look Behind | |
| Look Behind-Left | | Rally point | | | | Look Behind-Left | |
| Look Behind-Right | | Speed up | | | | Look Behind-Right | |
| Look Left | | Stay back | | | | Look Left | |
| Look Right | | Patrol patterns | | | | Look Right | |
| | | - Echelon | | | | | |
| | | - Column | | | | | |
| | | - Staggered col. | | | | | |
| | | - Wedge | | | | | |
| | | - Line | | | | | |
| | | - Vee | | | | | |
| | | - Open up | | | | | |
| | | - Tighten up | | | | | |
| | | Take cover | | | | | |
| | | Take defensive position | | | | | |
| | | Break Contact | | | | | |
| | | Hold/Stop Fire | | | | | |
| | | Initiate Fire | | | | | |
| | | Shift Fire | | | | | |
| | | Sector of Fire | | | | | | ns
METHOD AND SYSTEM FOR THE PRESENTATION OF INFORMATION VIA THE TACTILE SENSE

This application claims benefit under 35 USC 119(e)(1) of the Jun. 10, 2008 filing date of U.S. Provisional Application No. 61/060,267, the entirety of which is incorporated by reference herein.

STATEMENT REGARDING FEDERALLY SPONSORED DEVELOPMENT

Development for this invention was supported in part by Contract No. N00014-070M-0005 and N00014-08-C-0203 from the Office of Naval Research. Accordingly, the government may have certain rights in the invention.

FIELD OF THE INVENTION

The present invention relates to methods and systems for the presentation of information via the exteroceptive system, and in particular embodiments, to methods and systems for the systematic presentation of tactile sequences formed from a set of construction rules on a display.

BACKGROUND OF THE INVENTION

With the amount of data available today, the complexity of transmitting critical information in a readily perceived format is critical. A human's exteroceptive system includes nerves that respond to stimuli emanating from outside of the body via the five basic senses: sight, hearing, taste, smell, and touch. The sense of touch, including body awareness, is comprised of both tactile and kinesthetic sensory components and a motor subsystem. It is the tactile sense that arises from activation of the cutaneous sensors. Tactile systems include sensors located within the skin that capture sensations such as pressure and vibration, temperature, and pain at the skin's surface. By tapping unused sensory resources in the tactile system, additional communication presentation channels can be provided. Such an approach may lead to revolutionary gains in human information processing capabilities.

BRIEF DESCRIPTION OF THE INVENTION

In accordance with one aspect of the present invention, there is provided a method for communicating information via a tactile sense. The method comprises receiving input information at a controller comprising a processor. In addition, the method comprises generating a tactile sequence from the input information according to a predetermined communication structure via the controller and transmitting the tactile sequence to a display comprising a plurality of activators. Thereafter, the method comprises outputting the tactile sequence on the display.

In accordance with another aspect of the present invention, there is provided system for communicating information via a tactile sense. The system comprises a display comprising a plurality of activators and a controller comprising a processor and a memory. The controller is configured to receive input information, translate the input information according to a predetermined communication structure to generate a tactile sequence, and transmit the tactile sequence to a display comprising a plurality of activators for output of the tactile sequence on the display.

BRIEF DESCRIPTION OF THE DRAWINGS

The invention is explained in the following description in view of the drawings that show:

FIG. 11 depicts components of a predetermined communication structure in accordance with an aspect of the present invention.

DETAILED DESCRIPTION OF THE INVENTION

In accordance with particular aspects of the present invention, the present inventors have developed methods and systems for displaying structured communications in the form of tactile sequences to a display. In this way, the present invention vastly expands communication abilities outside of the standard exteroceptive senses, including visual and auditory senses. As a result, communications can be delivered to individuals when audio or visual communication is not possible, for example.

Figure 1:
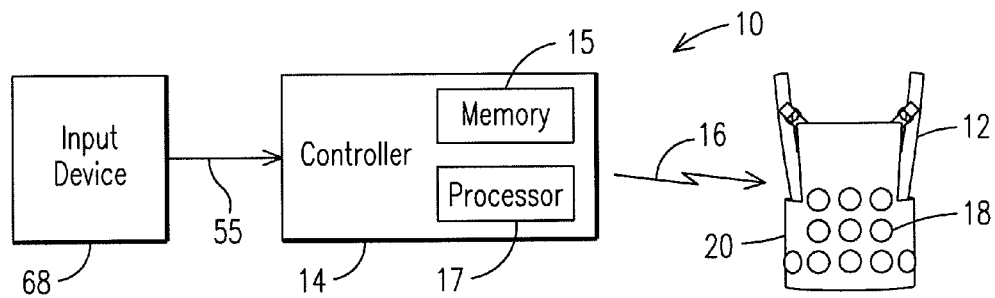
FIG. 1 is a schematic diagram depicting a system for the communication of information via a tactile sense in accordance with an aspect of the present invention.
Figure 3:
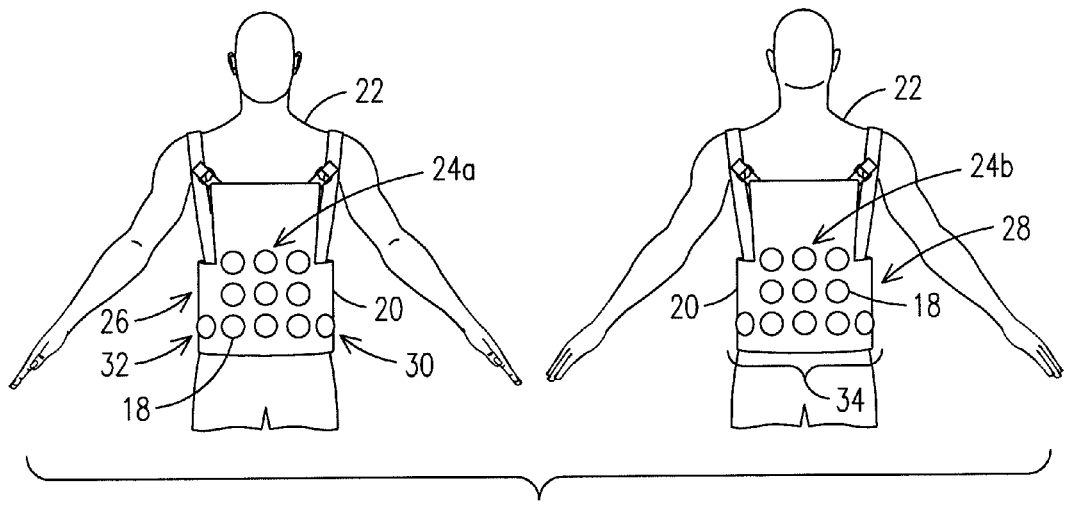
FIG. 3 depicts a front view and a back view of a user wearing a display in accordance with an aspect of the present invention.

Now referring to the drawings, FIG. 1 depicts a system 10 for communicating information via the tactile sense comprising a display 12 and a controller 14 (optionally comprising a memory 15 and a processor 17 as shown) for generating and transmitting a tactile sequence 16 to be outputted on the display 12. The display 12 comprises a plurality of activators 18 disposed on or within a portion of the display 12. The display 12 may be any suitable article that is releasably attachable to a body part of the user, e.g., torso, arm, thigh, head, etc., and that enables the user to recognize the outputted sensation of the activators 18, such as an armband, wristband, legband, headband, vest, or the like. In one embodiment, the display 12 is in the form of vest 20 worn by a user 22 as shown in FIG. 3. Although a vest 20 is shown, it is readily appreciated that the present invention is not so limited. In another embodiment, the display 12 may comprise a plurality of activators 18 disposed on or within the user's own attire, thereby delivering a tactile sequence to the user that may be interpreted by the user's tactile sense. In either embodiment, the display 12 defines a receiving device for the tactile sequence 16 sent from the controller 14 without the need for bulky equipment.

Generally, the activators 18 are spaced apart from one another by a certain distance depending on body location to form an array on the display 12. In one embodiment, as shown in FIGS. 1 and 3, the display 12 comprises a vest 20 having twenty activators 18 spaced apart from another, e.g., within 2 inches of each other. As shown in FIG. 3, two 3×3 activator arrays, front array 24a and back array 24b, are disposed on a front portion 26 and a back portion 28 of the display 12 (respectively). In one embodiment, the front array 24a overlies the abdomen/torso of the user 22 (when worn) and the back array 24b overlies the back of the user 22 (when worn). In addition, two additional activators 18 may be located at a far left point (leftmost activator 30) and a far right point (rightmost activator 32) of the display 12 such that a single circular belt 34 is defined along the lowest row of activators 18 of the front array 24a and the back array 24b. As shown in FIG. 3, the circular belt 34 has a similar appearance when viewing from a front and a back of the display 12. In an embodiment, when worn by the user 22, the circular belt 34 will lie just above the hip bones and in-line with or just below the naval of the user 22 while the uppermost row of activators 18 may lie approximately just below the ribs. Alternatively, the activators 18 may be arranged in any other desired configuration.

The activators 18 may provide any suitable output that may be perceived by the exteroceptive sense, including the tactile sense, of the user 22. By "tactile sense," it is meant any awareness of stimulation to the outer surface of the body from any external source. The tactile sense of the user thus includes, but is not limited to mechanoreceptors, nociorecep-tors, and thermoceptors. In this way, the tactile sequences discussed herein may be translated by the user's ability to sense touch, vibration, stress, pressure, temperature, pain, and the like.

In one embodiment, the activators 18 provide an output that causes the user 22 to sense at least one of pressure or vibration in a particular location on the display 12 (when worn). In a particular embodiment, the activators 18 comprise electromechanical vibrating motors, piezo-buzzers, vibrotactile activators, and/or pressure activators using technologies such as air (e.g., air puffs) or piston-type actuators. In yet another embodiment, the activators 18 may activate other skin sensors, such as those that respond to temperature changes. In addition, the activators 18 may provide an output that is also auditory and/or visual such that the output of the activators 18 may also be perceived via a visual or an auditory sense of the user 22. For example, the activators 18 may further comprise voice coils, miniature loudspeakers, or the like. Further alternatively, the activators 18 may provide any suitable output that may be sensed by the tactile system of the user 22.

Figure 4:
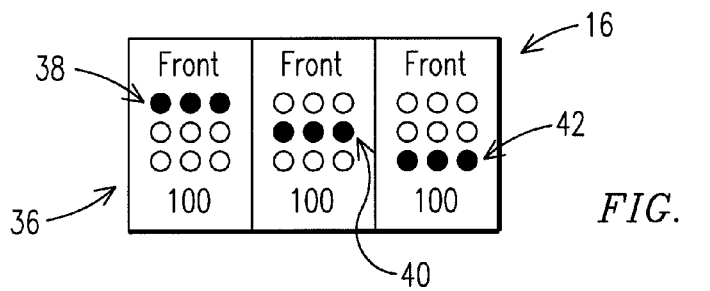
FIG. 4 depicts a tactile sequence in accordance with an aspect of the present invention corresponding to the communication "get down" in accordance with an aspect of the present invention.
Figure 5:
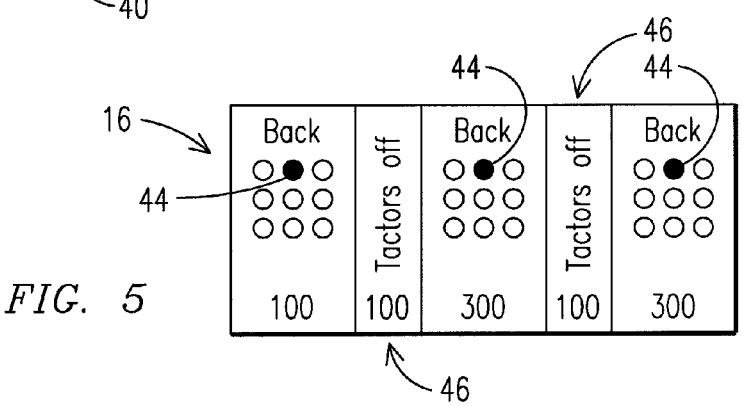
FIG. 5 depicts a tactile sequence in accordance with an aspect of the present invention corresponding to the communication "weapon jammed" in accordance with an aspect of the present invention.
Figure 6:
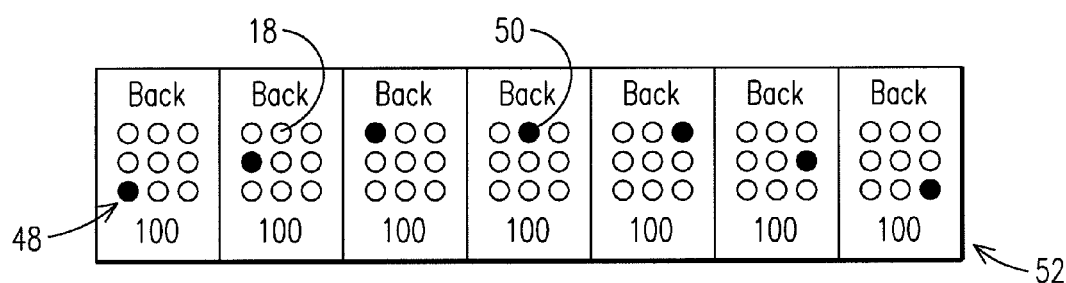
FIG. 6 depicts a tactile sequence in accordance with an aspect of the present invention corresponding to the communication "door" in accordance with an aspect of the present invention.

As shown in FIGS. 4-7, the tactile sequence 16 may be outputted on the front array 24a and back array 24b in a specific pattern to communicate specific information to the user 22 when the display is worn by the user 22. Specifically, certain activators 18 or rows 36 of activators 18 may be activated or successively activated such that the user senses certain activators 18 being activated at a given time. The pattern formed from one or more activators 18 being activated defines the symbol(s) and resultant tactile sequence 16 communicated to the user. In addition to the location of the stimulation of the activators 18, the duration to which an activator 18 or a row 36 of activators 18 may comprise part of the tactile sequence 16. Further, it is understood that a pause or period of no stimulation of the activators 18 may be included between periods of activation as shown in FIG. 6 as part of the tactile sequence 16. Each purposeful pause, stimulation of a single activator or group of activators at a given point in time is referred to as a "tactile symbol" herein.

In the embodiment shown in FIG. 4, for example, a tactile sequence 16 is shown that comprises the stimulation (activation) of a first row 38 of activators 18 on the front array 24a for 100 milliseconds (ms). Thereafter, a second row 40 of activators 18 is stimulated on the front array 24a for 100 ms. Further thereafter, a third row 42 of activators 18 is activated on the front array 24a for 100 ms. Collectively, when transmitted to the display 12 worn by the user 22, the tactile sequence 16 is translated by the user 22 into a predetermined communication, such as "get down" in the case of FIG. 4.

FIG. 5 shows another exemplary tactile sequence 16, wherein a first activator 44 is stimulated for 100 ms, followed by a pause 46 of 100 ms, followed by stimulation of the first activator 44 for a markedly longer 300 ms, followed by the pause 46 for another 100 ms, and the tactile sequence 16 is terminated by stimulation of the first activator 44 for another 300 ms. Each of the activators 18 is stimulated on the back array 24b of the display 12. This tactile sequence 16 may convey to the user 22 a predetermined communication, such as "weapon jammed."

FIG. 6 shows yet another exemplary tactile sequence 16 displayed on the back array 24b of the display 12. The tactile sequence 16 comprises a U-shaped pattern across the back array 24b, wherein the first three stimulations of activators 18 move from the bottom to the top of the leftmost column 48 of the back array (for 100 ms each) as shown in the first three frames. Thereafter, a top central activator 50 is stimulated for 100 ms followed by stimulation of the activators 18 along the rightmost column 52 from top to bottom for 100 ms each. In this way, a predetermined communication can be delivered to the user 22, for example, to convey the presence of an object, such as a door.

Figure 7:
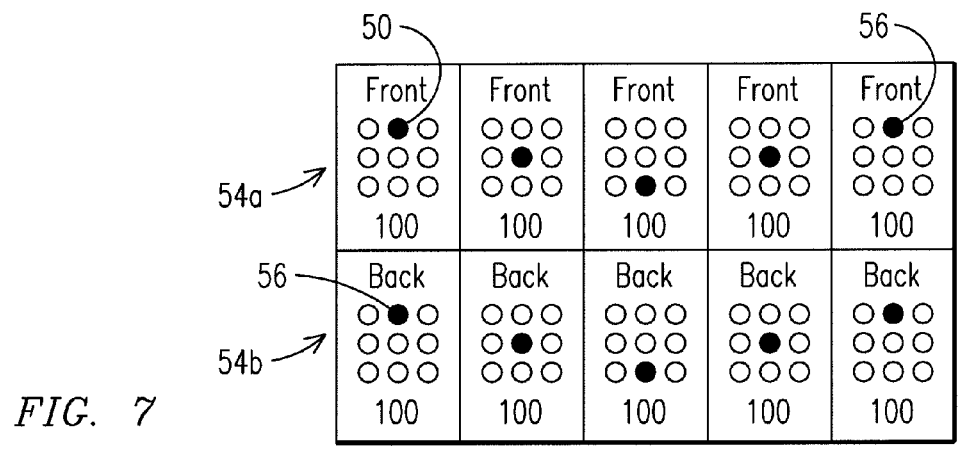
FIG. 7 depicts a tactile sequence in accordance with an aspect of the present invention corresponding to the communication "yes" in accordance with an aspect of the present invention.

FIG. 7 shows yet another exemplary tactile sequence 16 comprising two repeated sequences 54, wherein the first tactile sequence 54a is displayed on the front array 24a and the second tactile sequence 54b is displayed on the back array 24a of the display 12 in a V-pattern. Each stimulation of the activators 18 is for a period of 100 ms. The first tactile sequence 54a begins and ends at the top central activator 50 on the front array 24a while the second tactile sequence 54b begins and ends at the top central activator 56 on the back array 54b. The tactile sequence 16 may convey a predetermined communication, such as the response "yes" to the user wearing the display 12.

The structure and function of the controller 14 in generating the aforementioned tactile sequences will now be explained in further detail below. Referring again to FIG. 1, the controller 14 optionally comprises a memory 15 and a processor 17 as shown. Alternatively, the memory 15 and/or the processor 17 may be provided as peripheral devices in communication with the controller 14. As used herein, the term "controller" may refer to the controller 14 in communication with a processor 17, which may be integral with or separate from the controller 14. The controller 14 is configured to execute computer readable instructions for carrying out the present invention as set forth herein. The controller 14 may be in the form of any suitable computer, such as a hand-held device having a computer, a multiprocessor system, microprocessor-based or programmable consumer electronics, minicomputer, mainframe computer, or the like.

The memory 15 may, and preferably includes a volatile memory (e.g. random access memory), which is coupled with a data bus for storing information for the processor 17, and a non-volatile memory (e.g. read only memory) coupled with the data bus for storing static information and instructions for the controller 14. In one embodiment, the memory 15 includes a database comprising a plurality of tactile symbols 64 and tactile sequences 16 corresponding to particular numbers, words, commands, and the like, as well as the production rules 62 as described herein.

Figure 2:
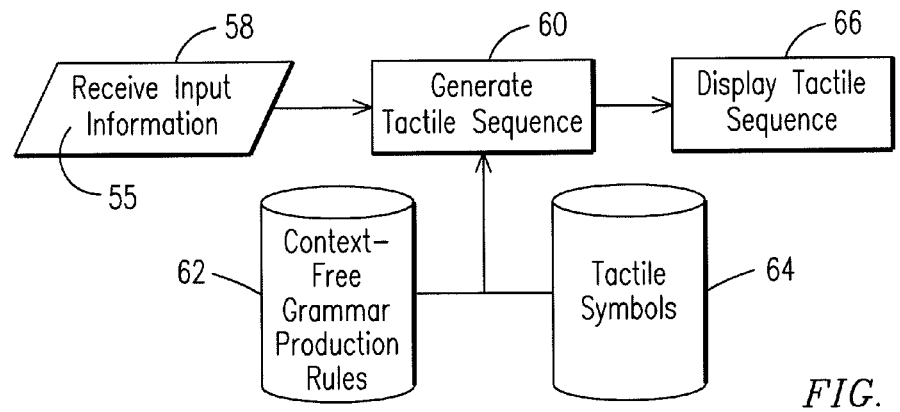
FIG. 2 is a flow diagram depicting steps in communicating a tactile sequence in accordance with an aspect of the present invention.

As shown in FIG. 1, the controller 14 is configured to receive input information 55, which comprises the communication to be outputted to the display 12 in the form of the tactile sequence 16. Thus, as used herein, the term "input information" may comprise an instruction, a response, information about surroundings, and any other information desired to be communicated in any suitable data form. As shown in FIG. 2, the controller 14 is specially configured to receive the input information 55 as shown by numeral 58 and generate the tactile sequence 16 as shown by numeral 60 according to specific context-free production rules 62 using particular tactile symbols 64. Thereafter, as shown by numeral 66, the generated tactile sequence 16 is displayed or output on the display 12. The generation of the tactile sequence 16 will be discussed in detail further below. Typically, the generated tactile sequence 16 is output on the display 12 by the controller 14 first transmitting data comprising the tactile sequence 16 in any suitable form to the display 12 followed by output of the tactile sequence 16 on the display. It is understood that to carry out the present invention, the controller 14 may be specially configured to execute computer-readable instructions for carrying out the claimed functions described herein, including but not limited to, receiving input information in any form, generating a tactile sequence from the received input information, and transmitting the tactile sequence to the display for output on the display.

The controller 14 may receive the input information 55, through a suitable data input device 68 (as shown in FIG. 1) to generate the tactile sequence 16. The input device 68 and the controller 14 are in communication with one another via any suitable wired or wireless connection. In addition, the input device 68 may include any one or more of a user-input device, e.g., a user interface, a keyboard, sensors located in the field, global positioning systems, a dispatch system, historical operating information, information stored within the memory 15, and the like. In one embodiment, the controller 14 and the input device 68 may be the same component such that the controller 14 obtains the input information 55 stored in the memory 15 to generate the tactile sequence 16. Accordingly, the input information 55 may include instructions (language) in any form that may be translated into the tactile sequence 16 according to the specific context-free production rules 62 by the controller 14.

When inputted manually, the input device 68 may comprise a keyboard, voice recognition software, gesture recognition software, or the like to provide the input information 55 to the controller 14. Alternatively, or in addition thereto, the input device 68 may be a device that is configured to provide the input information 55 to the controller 14 automatically, e.g., carbon monoxide detectors, sniper detectors, and the like. The controller 14 may then utilize the information from the input device 68 to form the tactile sequence 16, which is then transmitted from the controller 14 to the display 12. It is appreciated that the tactile sequence 16 may be communicated to the display 12 automatically in real-time or near real-time, at immediately, at a predetermined time, or at particular time intervals (which may be identical or different).

Figure 8:
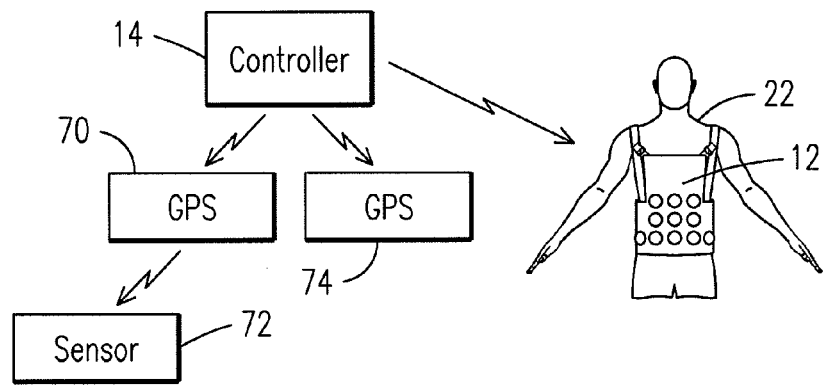
FIG. 8 depicts another embodiment of a system for communicating information via a tactile sense in accordance with an aspect of the present invention.

In one embodiment, as shown in FIG. 8, the input device 68 is in the form of a global positioning system (GPS) 70. The GPS system 70 may be disposed in the field and may be in communication with one or more sensors 72 for determining the location of object(s) or movement of individual(s). The sensors 72 may include motion detectors, chemical, e.g., carbon monoxide detectors, or any other sensor known in the art. Upon triggering of one or more sensors 72, the GPS system 70 and/or sensors 72 may transmit the input information 55 to the controller 14 via any suitable connection, e.g., wired or wireless connection. For example, the GPS system 70 and/or sensors 72 may communicate to the controller 14 that there are individual(s), object(s), and/or environmental condition(s) existing at a particular location. Further, an additional GPS system 74 may be provided, which may provide the location of the user 22 of the display 12. This information from GPS system 74 may be utilized to provide the position of the user 22 relative to the individual(s), object(s), and/or environmental condition(s) sensed by the GPS system 70 and/or sensors 72. Based on the information transmitted from the sensors 72 and/or GPS systems (70 and/or 74) to the controller 14, the controller 14 may generate a tactile sequence 16 corresponding to at least a portion of the GPS and/or sensor information, which is then delivered to the display 12 via the controller 14 via any suitable method and frequency, such as 250 Hz. Alternatively, the input information 55 may be provided to the controller 14 via any suitable configuration or method to provide a communication that will be transmitted to the device 12 in the form of the tactile sequence 16 (after translation of the communication into the tactile sequence 16 if necessary).

Figure 9:
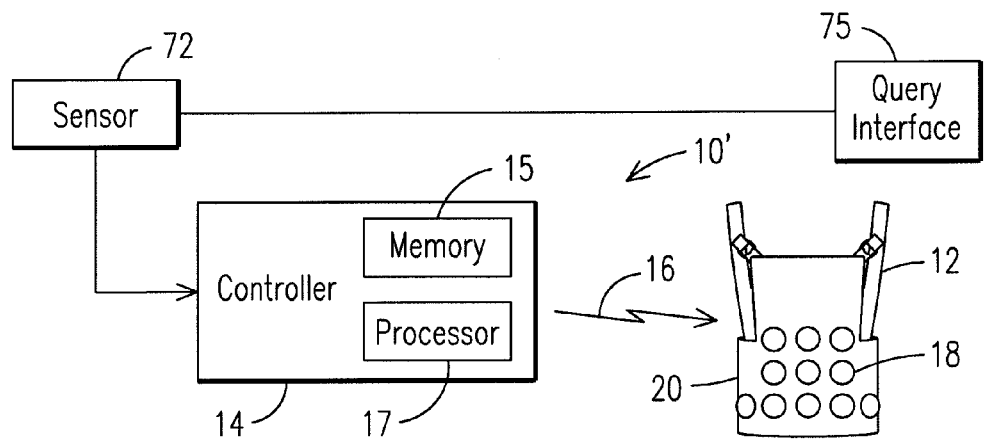
FIG. 9 depicts yet another embodiment of a system for communicating information via a tactile sense in accordance with an aspect of the present invention.

In yet another embodiment, the user 22 (or other person) may query the input device 68, such as the sensor 72, for real-time or near real-time information. For example, as shown in FIG. 9, there is depicted another embodiment of a system according to the present invention. The system 10' includes a controller 14 having a memory 15 and a processor 17 and a display 12 having a plurality of activators 18. As shown, the system 10' may include an input device 58, e.g., one or more sensors 72. A single sensor 72 is shown here for convenience. In the embodiment of FIG. 9, there is provided a query interface 75, which enables the user 22 (or other person) to request that information from the sensor 72 be delivered to the user 22 in the form of one or more tactile sequences 16 as described herein at the present time or a predetermined time in the future. The input information 55 received by the controller 14 from the sensor 72 upon request by the query interface 75 may be organized as desired and conveyed to the user 22. The query interface 75 is in communication with the controller 14 and the user 22 via any suitable wired or wireless connection, and may be in the form of any suitable computer, such as a hand-held device having a computer, a multiprocessor system, microprocessor-based or programmable consumer electronics, minicomputer, or the like. In addition to requesting information from sensors 72 as shown, the query interface 75 may request information from any other suitable source, such as a dispatch system, a database comprising historical operating information, or the like.

Figure 10:
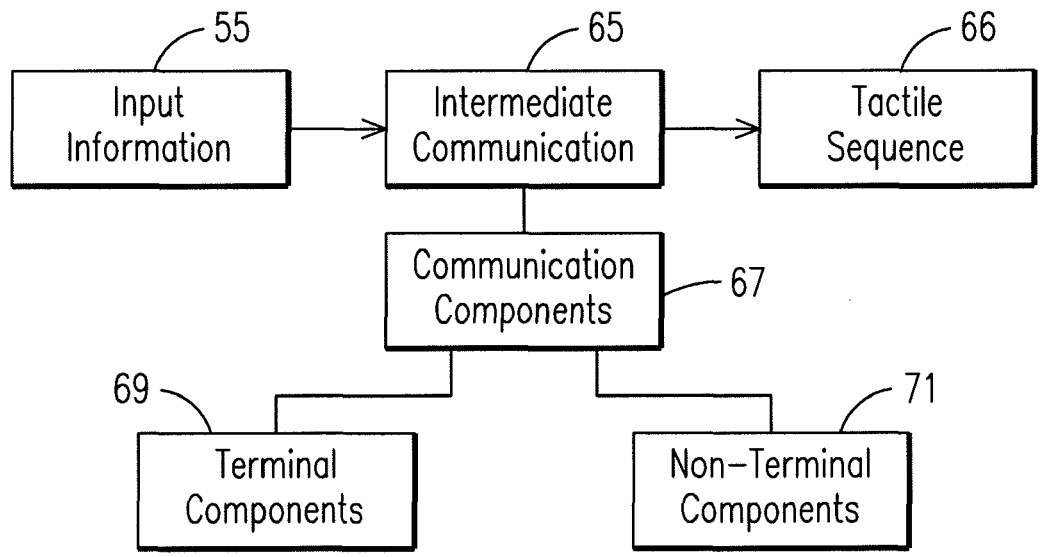
FIG. 10 depicts the translation of input information into an intermediate communication in accordance with an aspect of the present invention.

As mentioned above, in one embodiment, once the input information 55 is received by the controller 14, the tactile sequence 16 may be generated according to the specific context-free production rules 62. To accomplish this, as shown in FIG. 10, the input information 55 may be constructed into an intermediate communication 65 according to the predetermined context-free grammar production rules 62 as discussed below. The controller 14 will associate corresponding tactile symbols 64 (see FIG. 2) with corresponding word(s), number(s), and the like in the intermediate communication 65 to construct the tactile sequence 16 according to the production rules 62. Thus, the production rules 62 are provided to drive generation of a communication (in the form of the input information 55 or the intermediate communication 65), which is translated into the tactile sequence 16 comprising one or more of the tactile symbols 64 by the controller 14. In addition, the production rules 62 are used to create uniquely perceptible tactile sequences 16 for each entity in the vocabulary. Further, the production rules 62 may also be used to group similar terms using properties, such as spatial location, timing, on/off sequencing, and the like, to optimize intuitiveness, perceptibility, learnability and memorability of symbols.

In the exemplary embodiments set forth below, exemplary communication schemes are set forth using the context-free grammar production rules 62 to generate corresponding tactile sequences. The below examples are not meant to be limiting, but are merely illustrative of methods and systems that provide a plurality of different communications to be communicated to the user 22 via the display 12 in the form of a tactile sequence 16. Alternatively, as mentioned above, the communication may be communicated to the user 22 in any other form, which is perceptible by at least the user's tactile system in accordance with the present invention.

The input information 55 includes a communication that may be translated into the tactile sequence 16 according to the production rules 62. In a particular embodiment, the tactile sequence 16 is generated from the input information 55 according to a context-free grammar in the form:

$V \to w$ where V is a single nonterminal component and w is a string of terminals and/or nonterminals (which may be empty). In this way, the context-free grammar production rules 62 organize the components of communication (vocabulary) into a language by providing the systematic presentation of vocabulary.

In one embodiment, the production rules 62 forming the tactile sequences 18 comprise one or more of the following production rules to compile the intermediate communication 65 from the input information 55 to be translated into a tactile sequence 16. It is understood, however, that the input information 55 may comprise a communication that is already compiled in the format required by the production rules 62. In the following exemplary production rules, the intermediate communication 65 comprises a plurality of communication components 67 as shown in FIG. 10. The communication components 67 may in turn comprise terminal components 69 and non-terminal components 71. In one embodiment, the terminal components 69 are defined by one or more non-terminal components 71 as follows:

$S \to P_d P_c Q$
$P_d \to dP_n | \epsilon$
$P_n \to i_n N i_n | \epsilon$
$N \to nN | \epsilon$
$P_c \to C | S | o$
$Q \to d | N | \epsilon$ In the above production rules, S=Sentence; $P_d$=Direction Phrase; $P_c$=Core Phrase; $P_n$=Number Phrase; N=Number; Q=Qualifier and each represent non-terminal components. The terminal components may include the following definitions: $\epsilon$=empty terminator; d=Direction; n=Digit; $i_n$=indicator for a number c=Command; s=Status; o=Object.

In the first production rule set forth above, S is a complete tactile sentence comprising a direction phrase ($P_d$), a core phrase ($P_c$) and a Qualifier (Q). If a production rule 62 exists, the production rule is applied to the intermediate communication 65. In the S sentence, the direction phrase ($P_d$), for example, can either be empty ($\epsilon$; no direction provided) or consists of a direction (d) followed by a number phrase ($P_n$), indicating the distance of the object. The number phrase ($P_n$) can be either empty, e.g., direction without distance, or may consist of a number (N), preceded and followed by the number indicator ($i_n$). The number (N) is recursively formulated to produce numeric representations with as many digits as desired. The following examples further demonstrate how the tactile grammar optimizes communication based on information requirements, as compared to the respective spoken language equivalent.

If, for example, the desired tactile sequence 16 to be communicated to the user 22 is desired to inform the user that "I see an enemy sniper straight ahead, at 250 meters," the communication is provided as the input information 55 by any suitable method, such as input by keyboard, voice recognition software, or the like. The input information 55 comprising the communication is then translated into the intermediate communication 65 to more simply recite: "straight ahead-250-sniper," for example. It is understood that the former sentence "I see . . . " represents how the communication would generally be constructed in correct spoken English (subject-action-object-qualifier). However, for a warfighter, for example, it is of little importance who sees the sniper or if somebody saw or heard him. The important information is that there is a sniper and where it is. Hence, the subject can be omitted, and communication of location was determined most important, as it immediately shifts the warfighters' attention to the location of interest. This provides a chance of early visual detection of the object and deriving the action from the visual perception alone. The phrase (intermediate communication 65), "straight ahead-250 (meters)-sniper," shows the same information optimized for the warfighters' needs and to be translated into the tactile sequence 16. The units of the distance, e.g, feet or meters, may be predetermined such that providing a number is understood to include the units. It is understood that the sentence "straight ahead-250-sniper" or the like may be translated into this form from a much longer communication as explained above according to the production rules 62 by the controller 14.

Alternatively, the input information 55 may already be in the grammatical structure as would be modified according to the production rules 62 and may be transmitted to the display 12. Thus, no modification of the input information 55 into an intermediate communication 65 may be necessary in some cases. Instead, the input information 55 may be associated with particular tactile symbols 64 to generate a tactile sequence 16. Further alternatively, the controller 14 may be provided with data representing a tactile sequence 16 and may then transmit the tactile sequence 16 in any suitable data form to the display 12.

Referring again to the present example, location and distance of an object of interest are presented first. This provides a chance for timely detection of the object, even before it was specified. As indicated above, the controller 14 may then find corresponding components (69 or 71) for each entity in the simplified intermediate communication 65: "straight ahead-250 (meters)-sniper." There are corresponding tactile symbols 64 for each of the entities "straight ahead," "250" and "sniper." The controller 14 then structures the tactile sequence 16 from the tactile symbols 64 corresponding to the entities "straight ahead," "250," and "sniper."

In another example, the communication "Peter is out of ammunition" is to be conveyed to the user 22 (e.g., warfighter). This sentence represents the typical spoken construct.

With this knowledge, the warfighter would typically cover the area of responsibility of the individual who is out of ammunition. It is not important who is out of ammunition, but where that individual is located (and hence what area needs to be covered by the message recipient). As a result, the subject can thus be omitted and replaced by a spatial description. A verb is not required to understand the meaning of this construct; hence, the following intermediate communication 65 comprising only direction and status, is an adequate representation of the information content, e.g., "To your left-out of ammunition." This simplifies the grammar and reduces the number of required symbols. In this way, the production rules 62 of the present invention utilize a context-free grammar to suit communication needs based on the vocabulary and domain of interest. As indicated above, the controller 14 may then associate corresponding tactile symbols 64 for each entity in the simplified intermediate communication 65: "to your left-out of ammunition." The controller 14 then structures the tactile sequence 16 from the tactile symbols 64 corresponding to the entities "to your left" and "out of ammunition."

In yet another embodiment, the present invention develops tactile symbols for displaying communications captured via hand signals within the Special Operations Domain. Exemplary hand signals for Close Range Engagement were set forth in U.S. Provisional Application No. 61/060,267, the entirety of which is hereby incorporated by reference. To allow more flexibility and a wider array of possible communications, in one embodiment, the present invention uses spatial and temporal properties as design variables in addition to the symbol itself. Thus, in one embodiment, the location as well as the duration for which each of the activators 18 provides an output may be varied to provide a different communication.

In yet another exemplary embodiment showing further production rules, the following production rules 62 may be used to develop intermediate communications 65 and subsequent tactile sequences 18 comprising tactile symbols 64 that maintain consistency among categories and facilitate decoding by the user:

a) All unidirectional commands are presented using the front array 24a;

b) Direction is consistently given through the lowest row of activators (e.g., the circular belt 34) using egocentric direction information;

c) Distance is consistently presented through numbers using the back array 24b, mapping each digit to a phone dial pad;

d) Objects are presented using the back array 24b;

e) Status updates are presented using the back array 24b; and f) All responses are presented using both the front array 24a and the back array 24b.

One exception to production rules (a)-(f) above is that critical commands such as "take defensive position" and "take cover" may use both front and back arrays (24a, 24b) to provide maximum intrusiveness.

Referring again to FIG. 11, in forming the intermediate communications to be translated into a tactile sequence 16, the components of the intermediate communication 65 may be placed into three categories, e.g., location 76, core content 78, and qualifier 80. FIG. 11 shows examples in each category.

The location 76 (category) may be comprised of two subcategories: direction 82 and distance 84. To facilitate natural mapping, direction-related symbols may be presented on the circular belt 34. Direction cues are further subdivided into two command categories: "move to" 86 or "look" 88. The position of the stimulated one(s) of the activators 18 represents the direction and space to which the user is instructed to move to or to the direction and space where the user's attention may be directed. In one embodiment, a long static pulse represents "move to," while three short pulses represent a "look" command. This directional cue may be followed by a sequence of tactile symbols 64 indicating the distance 84 of the object. Numbers may be made up of digits represented on the back array 24b, resembling the order of a telephone dial pad (with exception of the "0" which is represented by the leftmost activator 30 and the rightmost activator 32 outside the front array 24a and the back array 24b to avoid ambiguity through double-occupancy).

The second category, core content 78, may comprise four different subcategories: commands 90, status updates 92, objects 94, and responses 96, each of which carry the main implication of the communication. The placement of the tactile symbols 64 under these subcategories may be assigned based on information processing resources needed.

Commands 90 may be direct orders given to the user 22, e.g., a warfighter in this example. Not only do the commands 90 require perception, but also comprehension and execution of information (e.g., an order). In one embodiment, a separate section of the display 12, the front array 24a is solely used for the purpose of presentation of the symbols 64 comprising the tactile sequence 16 (see FIG. 3, for example) for the commands 90.

Status updates 92 refer to information that is automatically displayed by the system 10 to the soldier as needed (e.g. ammunition status). All tactile symbols 64 for the status updates 92 may be located on the back array 24b (see FIG. 5, for example).

Objects 94 refer to noun symbols (e.g., IEDs, sniper, enemy, hostile etc) conveyed to the user 22, e.g., a warfighter. All tactile symbols 64 for the objects 94 may be located on the back array 24b of the display 12 (see FIG. 6, for example).

Both aforementioned subcategories (status updates 92 and objects 94) in some cases require comprehension and execution, but namely only call for perception without further action. If further action is required, a command 90 will typically follow.

Responses 96 refer to comprehension status of received information and are transmitted through feedback to specific questions (e.g. 'no', 'yes', 'I understand'). In order to differentiate this subcategory from the previous ones, a combination of both back and front arrays (24a, 24b) may be used (see FIG. 7, for example).

In this exemplary embodiment, the third and last main category is the qualifier 80, which primarily consists of a number (e.g., door number 3) or a second direction with regard to the preceding core content 78 (e.g., direct SAW operator to side of formation). The qualifier 80 may be presented in the same fashion as previously described for the location 76. Specifically, the qualifier 80 may comprise subcategories direction 98 and distance 99. The position of the stimulated one(s) of the activators 18 represents the direction and space to which the user is instructed to move.

Alternative embodiments may include different categories of communication components depending on the vocabulary of interest, and would result in different construction rules to associate communication categories with tactile properties (e.g., spatial placement, temporal aspects) to optimize perceptability, intuitiveness, learnability and memorability of tactile language. In addition to the military-related examples provided above, the systems and methods of the present may be advantageously employed in other embodiments, such as for example, applications related to gaming, assistive technology, emergency responders, law enforcement, system operators (control rooms, pilots, drivers), and the like.

Figure 12:
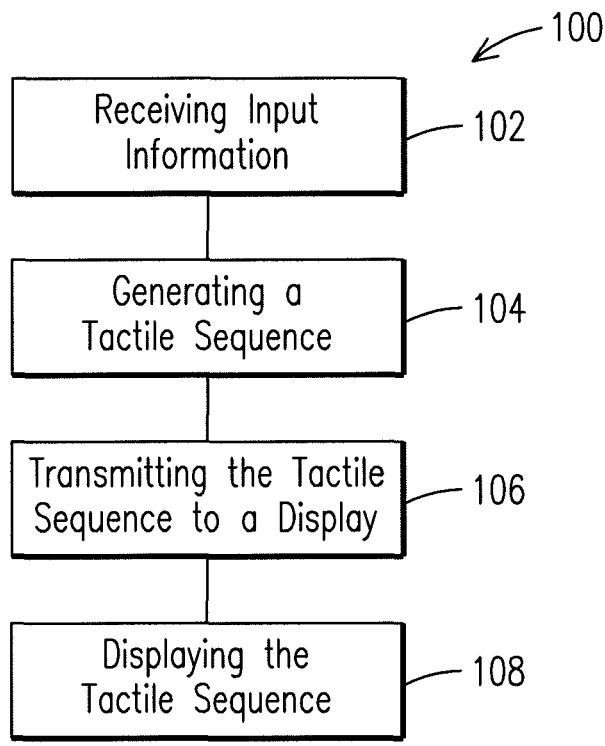
FIG. 12 is a flow diagram of a method in accordance with an aspect of the present invention.

In accordance with another aspect of the present invention, as shown in FIG. 12, there is provided method 100 for communicating information via a tactile sense. The method 100 comprises step 102 of receiving input information 55 at a controller 14 comprising a processor 17 (and optionally a memory 15). Thereafter, the method comprises step 104 of translating the input information 55 according to a predetermined communication structure 62 to generate a tactile sequence 16 via the controller 14 and step 106 of transmitting the tactile sequence 16 to a display 12 comprising a plurality of activators 18. Once transmitted to the display 12, the method comprises step 108 of displaying the tactile sequence 16 on the display 12. In one embodiment, the predetermined communication structure 62 comprises two or more communication components (e.g., location 76, core content 78, and qualifier 80) configured in a predetermined order.

The utility of the above-described method is widespread as it can be used to expand communication channels to include the tactile sense in receiving complex, context-free communications. Further, the herein described methods to create unique tactile sequences of desired communications can develop tactile communications where individual symbols are learned and used to create readily interpreted tactile communications using a string of appropriately selected symbols. Using this method, a complex context-free language can be developed for the tactile sense, which may be utilized to off-load visual and/or auditory communications or offer alternative incoming communication alternatives to individuals with a limited visual and/or auditory sense.

It is understood when an element as described herein is used in the singular form, e.g. "a" or as "one or more," or the like, the element is not so limited to the singular form, but may also encompass a plurality of such elements.

Further, based on the foregoing specification, the above-discussed embodiments of the invention may be implemented using computer programming or engineering techniques including computer software, firmware, hardware or any combination or subset thereof, wherein the technical effect is to receive information, generate a tactile sequence corresponding to the information, and transmit the tactile sequence to a display, as well as carry out the other tasks described herein. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate special purpose computer hardware, such as a microprocessor, to create a computer system or computer subsystem of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A system for communicating information via a tactile sense comprising:
a display comprising a plurality of activators;
a controller comprising a processor and a memory configured to:
receive input information, comprising at least one of an instruction, a response, location of the display relative to an object, and context information regarding a surrounding environment;
translate the input information according to a predetermined communication structure to generate a tactile sequence; and
transmit the tactile sequence to a display comprising a plurality of activators for output of the tactile sequence on the display;
wherein the generated tactile sequence is generated from an intermediate communication from the input information according to the predetermined communication structure;
wherein the predetermined communication structure comprises a category selected from one or more of a location, a core content, or a qualifier; and
wherein the qualifier comprises a number specific to an object in the surrounding environment.

2. The system of claim 1, wherein the tactile sequence comprises a plurality of tactile symbols, and wherein the controller is further configured to associate components of the intermediate communication with respective ones of the plurality of tactile symbols to generate the tactile sequence.

3. The system of claim 1, wherein the location comprises at least one of a direction component, and the direction component and a distant component, and wherein the core content comprises at least one of an instruction, context of the surrounding environment, an object, a status update, and a response.

4. The system of claim 1, wherein the display comprises an article of clothing to be worn by a user, and wherein the article of clothing comprises a front array of activators, a back array of activators, a right activator disposed on a right side of a lower row of the front array and the back array and, and a left activator disposed on a left side of a lower row of the front array and the back array, wherein the right activator and the left activator define a circular belt on a bottom portion of the display.

5. The system of claim 1, further comprising an input device configured to provide the input information to the controller.

6. The system of claim 5, wherein the input device is a global positioning system.

7. The system of claim 5, wherein the input device comprises a plurality of sensors, and further comprising a query interface configured to request that the input information be sent from the sensors to the controller.

8. The system of claim 1, wherein the number comprises a designation for the object, a direction to the object, and/or a space to the object.

9. A method for communicating information via a tactile sense comprising:
- receiving input information, comprising at least one of an instruction, a response, location of a display relative to an object in direction and space, and context information regarding a surrounding environment, at a controller comprising a processor;
- generating a tactile sequence from the input information according to a predetermined communication structure via the controller;
- transmitting the tactile sequence to the display comprising a plurality of activators; and
- outputting the tactile sequence on the display;
- wherein the generating a tactile sequence comprises generating an intermediate communication from the input information according to the predetermined communication structure;
- wherein the predetermined communication structure comprises a category selected from one or more of a location, a core content, or a qualifier; and
- wherein the qualifier comprises providing a number of a specific object in the surrounding environment.

10. The method of claim 9, wherein the number of the specific object comprises a designation for the specific object, a direction to the specific object, and/or a space to the specific object.

11. The method of claim 9, wherein the tactile sequence comprises a plurality of tactile symbols, and wherein the generating a tactile sequence further comprises associating components of the intermediate communication with respective ones of the plurality of tactile symbols to generate the tactile sequence.

12. The method of claim 9, wherein the location comprises at least one of a direction component, and the direction component and a distant component.

13. The method of claim 9, wherein the core content comprises at least one of an instruction, context information regarding the surrounding environment, an object, a status update, and a response.

14. The method of claim 9, wherein the display comprises an article of clothing to be worn by a user, and wherein the article of clothing comprises a front array of activators, a back array of activators, a right activator disposed on a right side of a lower row of the front array and the back array and, and a left activator disposed on a left side of a lower row of the front array and the back array, wherein the right activator and the left activator define a circular belt on a bottom portion of the display.

15. The method of claim 9, wherein the display is worn by a user, and wherein the receiving input information comprises input information from an input device located at a distance from the controller.

16. The method of claim 15, wherein the input device is a global positioning system.

17. The method of claim 15, wherein the input device comprises one or more sensors to determine at least one of a current location of the display, a current position of the display, and a current environmental state surrounding the display, and further comprising requesting the input information from the sensors via a query interface.

18. The method of claim 9, wherein the controller further comprises a memory.

\* \* \* \* \*